Oct. 20, 1931.  A. L. FREEDLANDER  1,828,136

PULLEY

Filed April 11, 1928  4 Sheets-Sheet 2

Inventor
ABRAHAM L. FREEDLANDER,
BY
Toulmin & Toulmin
Attorneys

Oct. 20, 1931.　　A. L. FREEDLANDER　　1,828,136
PULLEY
Filed April 11, 1928　　4 Sheets-Sheet 3

Inventor
ABRAHAM L. FREEDLANDER,
BY
Toulmin & Toulmin
Attorneys

Oct. 20, 1931. A. L. FREEDLANDER 1,828,136
PULLEY
Filed April 11, 1928 4 Sheets-Sheet 4

Patented Oct. 20, 1931

1,828,136

UNITED STATES PATENT OFFICE

ABRAHAM L. FREEDLANDER, OF DAYTON, OHIO

PULLEY

Application filed April 11, 1928. Serial No. 269,182.

My invention relates to pulleys.

It is the object of my invention to provide the combination of a cog belt with side driving walls and an inner driving face through the belt driving one pulley through its sides and the other pulley through its inner face through the cogs.

In particular, it is my object to have one pulley with which the sides of the belt engage with a V-shaped groove for engaging the sides of the belt and the other pulley with which the inside of the belt engages having a toothed surface for engaging with the teeth on the inside of the belt.

It is my object to use such pulleys with a belt of fabric and rubber known as a raw-edged or side-drive belt of the character shown in my Patent No. 1,611,829 of December 21, 1926.

It is my object to provide pulleys preferably of metal or composition material; and to provide for the toothed-surface of the pulley engaging the teeth on the belt by furnishing a toothed lagging which may be mounted upon the smooth surface of the pulley and attached thereto by being slipped on under tension, cemented on or put on as a strip and cemented down with the ends of the overlapping.

It is my further object to provide the combination of such a belt and pulleys in which one belt may be employed or a plurality of separate belts may operate in separate grooves in the common pulley having V-shaped grooves and upon a common lagging or separate sections of lagging on the common pulley carrying the teeth for engaging with the toothed inside surface of the belt.

Referring to the drawings.

Figure 1:
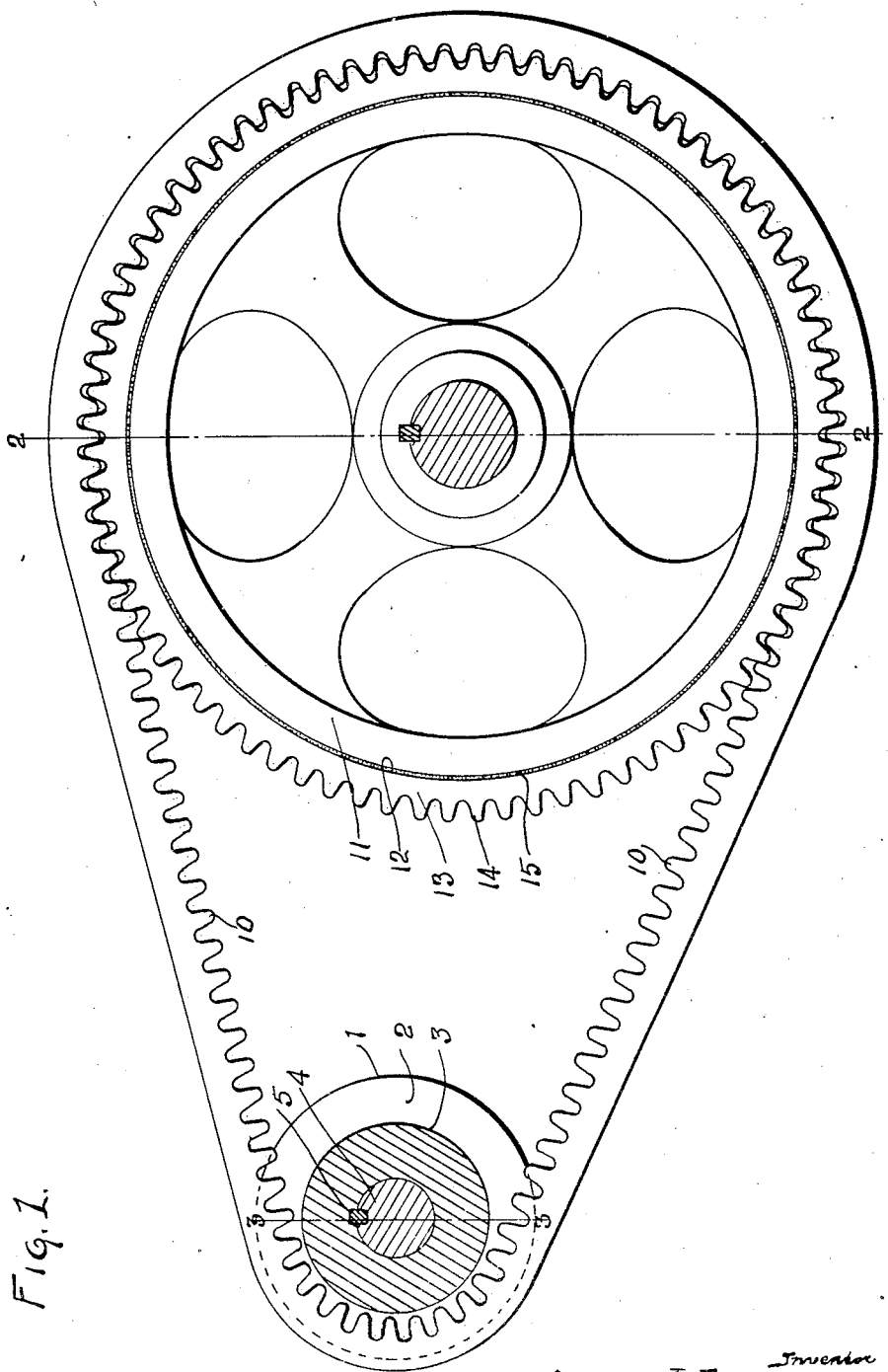
Figure 1 is a side elevation of a typical installation embodying my pulleys and belt.
Figure 2:
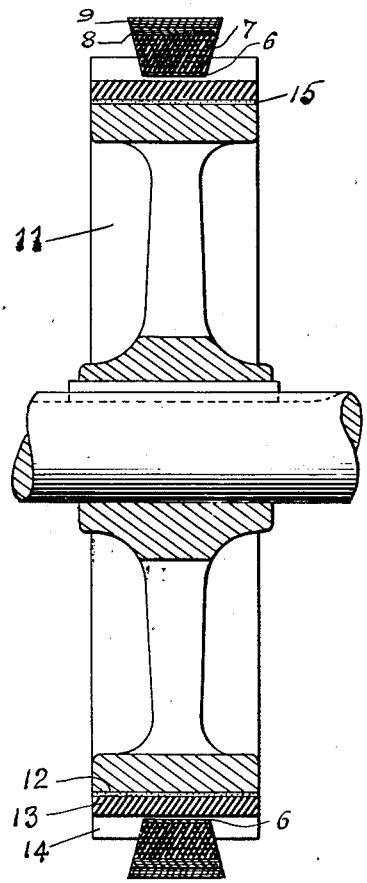
Figure 2 is a section on the line 2—2 of Figure 1.
Figure 3:
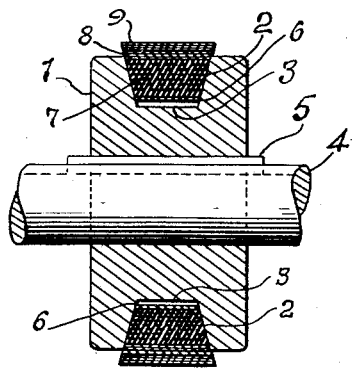
Figure 3 is a section on the line 3—3 of Figure 1.
Figure 4:
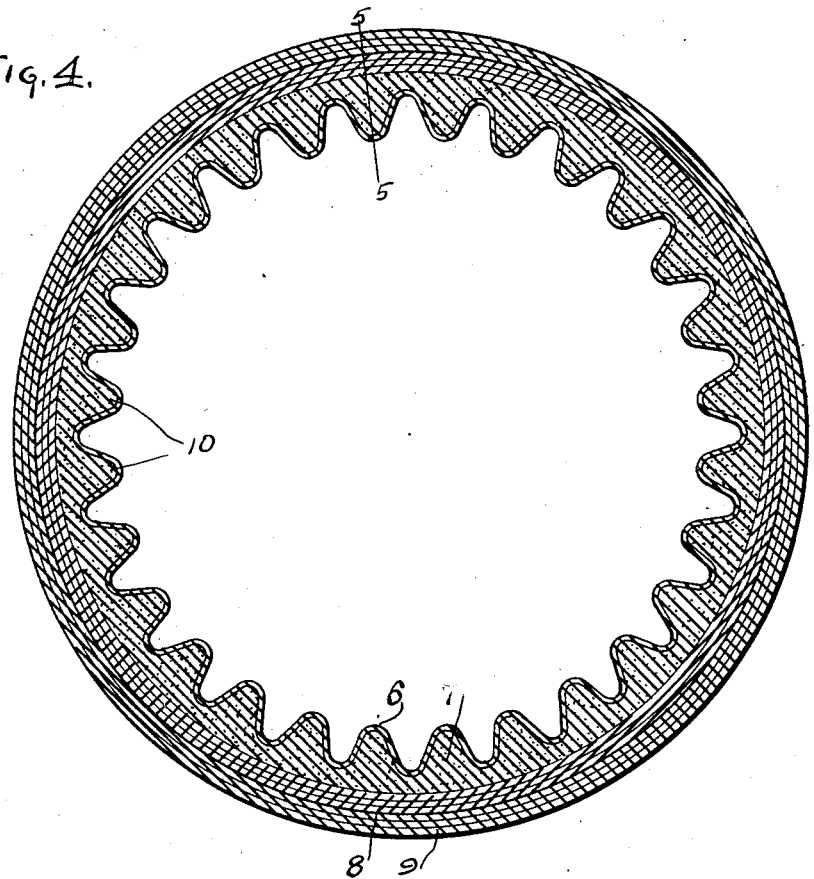
Figure 4 is a section on the line 4—4 of Figure 5.
Figure 6:
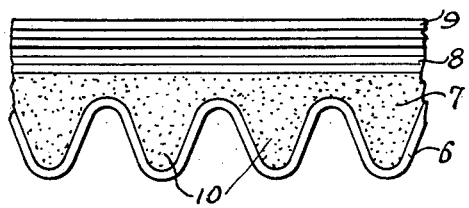
Figure 6 is a side elevation of a section of the belt.
Figure 5:
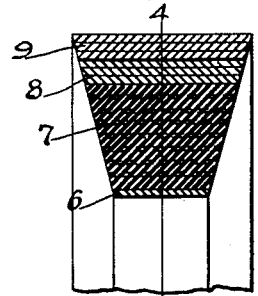
Figure 5 is a section on the line 5—5 of Figure 4.
Figure 7:
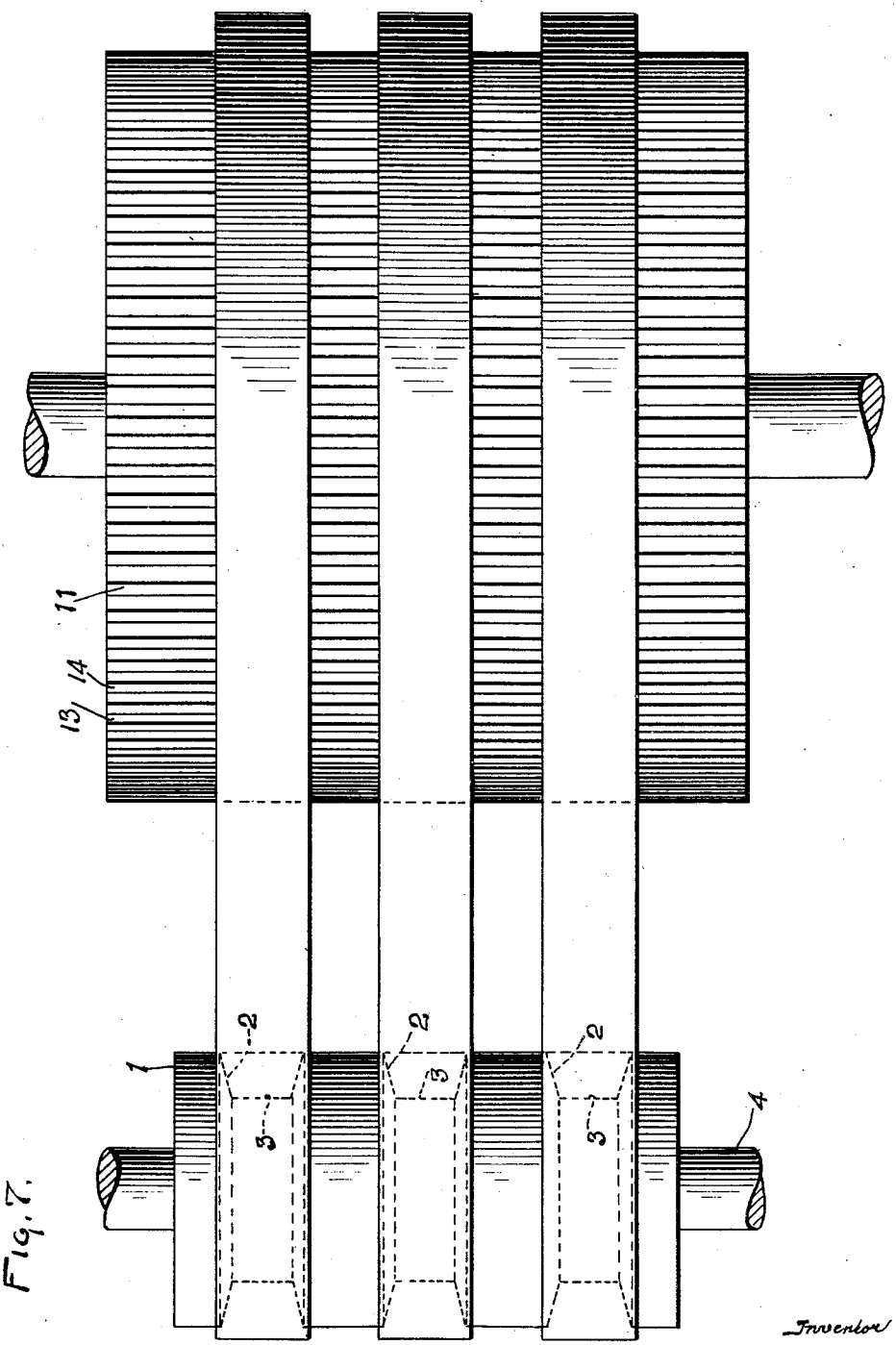
Figure 7 is a plan view of my invention adapted to a pulley having a plurality of grooves in which a plurality of separate belts are used.

Referring to the drawings in detail, 1 designates a pulley having a V-shaped groove with inwardly tapering walls 2.

Between the walls is a floor 3. 4 designates the supporting shaft on which the pulley 1 is mounted and retained thereon by the key 5.

Mounted within the V-shaped groove is a raw-edged belt of fabric and rubber of trapezoidal section. This belt consists of an inner layer of fabric 6; next above this inner layer of fabric is the layer generally designated 7 consisting of the compression member while the neutral axis is formed of the layers of fabric 8 which form the back bone of the belt, while the layers of material, such as fabric, 9 constitute the tension member of the belt. The edges or sides of the fabric are exposed forming raw edges facilitating a side drive through the sides of the belt against the sides of the grooved pulley.

The inner surface of the belt is formed into a plurality of teeth 10 but the inner surface of the belt does not engage the surface 3 in the grooves of the pulley 1.

It will be understood that any type of belt may be utilized, but I am describing my preferred form of belt for use in connection with this arrangement of pulleys.

Turing to the larger pulley designated 11 it will be noted that it has a smooth surface 12. I provide a corrugated, toothed lagging 13 having teeth 14. This lagging is preferably of rubber or a combination of fabric and rubber and, if desired, may be stretched sufficiently to slide it over the surface 12 of the pulley 11 which has been coated with a cement 15. It will then contract upon the surface and be firmly cemented to the pulley 11. The teeth 14 engage with the teeth 10. As pointed out elsewhere, this lagging may be applied in other manners but this is the preferred form.

While it is within the scope of my invention to provide a toothed surface, integral with the pulley, such as 11, yet I prefer the inexpensive method of utilizing a pulley preferably of metal or composition material with a smooth surface and then placing the inexpensive molded toothed lagging upon the smooth surface thereby eliminating the necessity for accurate machining operations which are expensive and tedious. It is also possible for me to apply my invention to existing pulleys and thereby greatly increase the present efficiency of other drives without disturbing the machinery or causing the necessity of new installations.

It is preferred that this lagging would be of the same material or materials as the belt. This provides a noiseless structure that needs no lubrication and that will readily withstand heat.

The yielding nature of the teeth of the respective belt and lagging will cause a proper engagement and accommodation of the parts one to the other irrespective of minor variations in size due to initial variations in manufacture or variations due to wear.

By grooving the small pulley, the expensive operation of grooving is reduced to the minimum while the maximum efficiency is obtained through side drive where the tendency to slip is greatest, namely, on the small pulley.

It is to be noted that my invention is adaptable to single belts or a multiple of belts used on common pulleys.

It will be noted that I desire to comprehend within my invention such modifications as may be necessary to adapt it to varying conditions and uses.

Having thus fully described my invention, what I claim as new and desire to secure by Letters Patent, is:

In a transmission apparatus, a plurality of grooved pulleys of substantially uniform shape and cross section having straight internal metallic and sloping driving surfaces of substantially V cross section, an additional pulley having on the periphery thereof a plurality of spaced compressible teeth of uniform cross section in combination with a plurality of belts of fabric and rubber of substantially trapezoidal cross section having substantially straight side driving surfaces, the raw edges of which contact with the driving side walls of said first mentioned pulleys and having on their inner surfaces a plurality of compressible teeth of uniform cross section, said pulley first mentioned and said belts being so shaped that the teeth of said belts are out of contact with the innermost portions of the V's of said pulleys, said teeth of all of said belts meshing with the teeth of said additional pulley and the side portions of said belts being out of contact therewith.

In testimony whereof, I affix my signature.

ABRAHAM L. FREEDLANDER.